(12) United States Patent
Branca

(10) Patent No.: US 7,478,509 B2
(45) Date of Patent: Jan. 20, 2009

(54) DEVICE AND METHOD FOR CONNECTING PROFILES

(75) Inventor: Alfonso Branca, Milan (IT)

(73) Assignee: Top Glass S.p.A., Pi-Oltello (IT)

( * ) Notice: Subject to any disclaimer, the term of this patent is extended or adjusted under 35 U.S.C. 154(b) by 835 days.

(21) Appl. No.: 10/496,929

(22) PCT Filed: Jun. 30, 2003

(86) PCT No.: PCT/EP03/06936

§ 371 (c)(1),
(2), (4) Date: May 25, 2004

(87) PCT Pub. No.: WO2004/029467

PCT Pub. Date: Apr. 8, 2004

(65) Prior Publication Data

US 2006/0053731 A1  Mar. 16, 2006

(30) Foreign Application Priority Data

Sep. 24, 2002  (IT) .......................... MI2002A2016

(51) Int. Cl.
*E04C 2/42* (2006.01)
(52) U.S. Cl. .......................................... 52/669; 52/664

(58) Field of Classification Search ................... 52/664, 52/669, 690, 729.1; 403/253–255, 264; 15/215–219, 15/238–241
See application file for complete search history.

(56) References Cited

U.S. PATENT DOCUMENTS

| 2,302,586 | A | * | 11/1942 | Thelen .......................... 52/669 |
| 4,981,735 | A |   | 1/1991 | Rickson |
| 5,219,406 | A | * | 6/1993 | Raz .............................. 160/135 |
| 5,363,612 | A | * | 11/1994 | Erickson ....................... 52/239 |
| 6,672,026 | B2 | * | 1/2004 | Sumerak ....................... 52/690 |
| 2001/0017019 | A1 |   | 8/2001 | Degelsegger |

FOREIGN PATENT DOCUMENTS

| DE | 7119423 | 1/1973 |
| FR | 2 721 074 | 12/1995 |

* cited by examiner

*Primary Examiner*—Robert J Canfield
*Assistant Examiner*—Christine T Cajilig
(74) *Attorney, Agent, or Firm*—Andrew Wilford

(57) ABSTRACT

The device for connecting profiles comprises a body exhibiting first and second connecting means on each of its opposed walls adapted for respectively engaging on a first and second portion of each profile, the first and the second portion being at different distances from the axis of said profile.

11 Claims, 3 Drawing Sheets

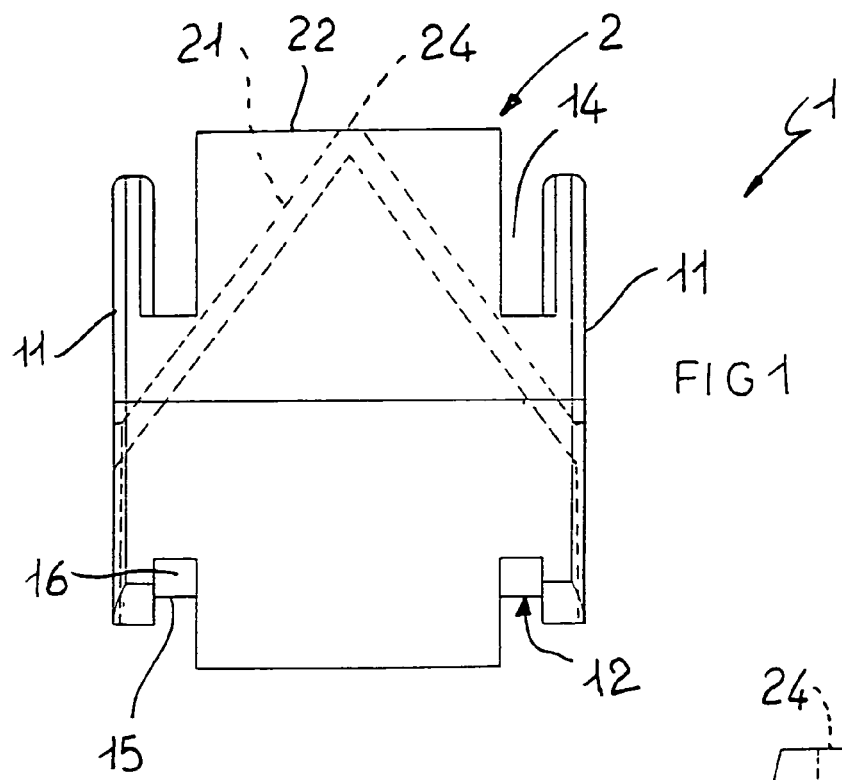
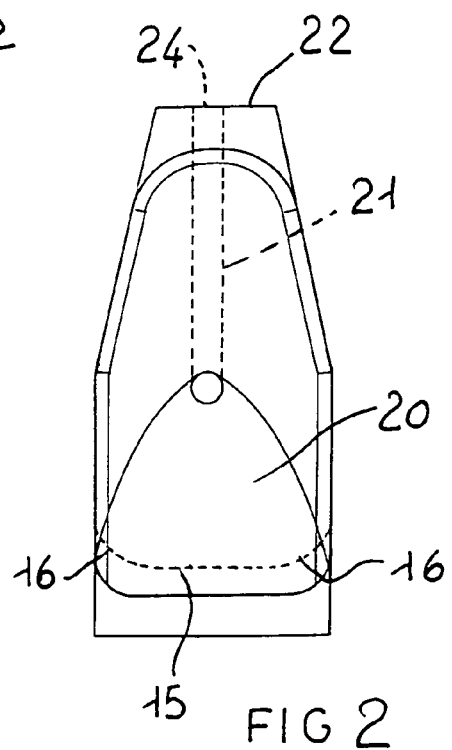
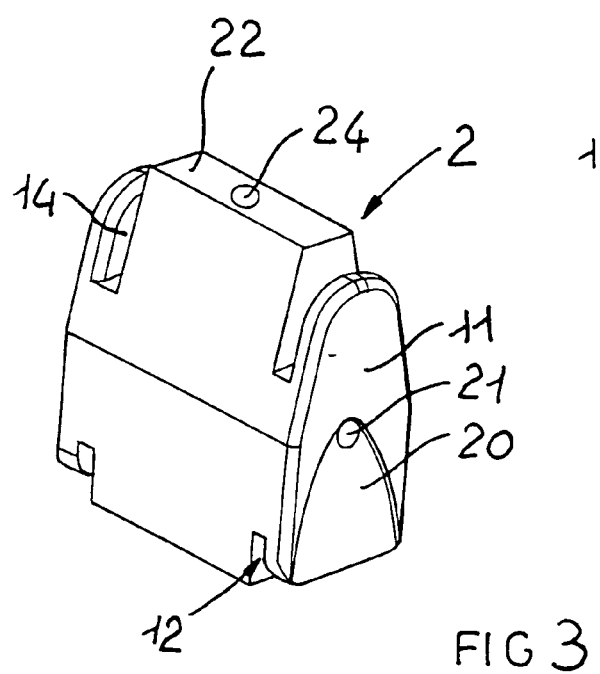

DEVICE AND METHOD FOR CONNECTING PROFILES

CROSS REFERENCE TO RELATED APPLICATIONS

This application is the US national phase of PCT application PCT/EP03/06936, filed 30 Jun. 2003, published 8 Apr. 2004 as WO 2004/029467, and claiming the priority of Italian patent application MI2002A002016 itself filed 24 Sep. 2002, whose entire disclosures are herewith incorporated by reference.

FIELD OF THE INVENTION

The present invention relates to a device and a method of connecting profiles.

In particular in the following description, reference shall be made to devices for connecting profiles made of a composite material with plastic material matrix, such as for example plastic reinforced by fibre glass.

BACKGROUND OF THE INVENTION

The use of profiles made of composite material has widely spread and in some applications it has replaced the use of profiles made of a metal material, thanks to the features of the material, which can be summarized as high resistance to fire and/or to high temperatures, together with good mechanical properties and lack of corrosion problems.

Of course, such profiles are used in combination with other profiles for making variously complex structures that should be capable of performing their functions, such as off-shore applications and the manufacture of grids.

However, the manufacture of connections between the various profiles has considerable disadvantages; in fact, it is very dangerous to make nailed or bolted connections since very high internal tensions are created the profile portions gripped between the bolts, which can cause the profile to break, with easily imaginable negative consequences, sometimes also due to the different thermal expansion levels of the components.

Moreover, metal or similar mechanical connections do not provide resistance to high temperatures and/or to fire, are very complex, require appropriate equipment, and are difficult to make using automated systems.

OBJECT OF THE INVENTION

The object of the present invention therefore is making a device and a method of connecting profiles that should make it possible to eliminate the above technical disadvantages of the prior art.

Within this technical task, an object of the invention is that of making a device and a method that should allow connecting to one another profiles made of a composite material, such as plastic reinforced by fibre glass, which should exhibit a high resistance to high temperatures and/or to fire without the risk of mechanical weakening portions of the profiles during connection and eliminating the risk of residue tensions of the profiles after the connection, as may be generated by the nails or bolts installed.

Another object of the invention is that of making a device and a method that should be applicable in a flexible manner, adapting them to the specific construction circumstances and in an automated manner; for example, the device can be installed in two mutually opposed directions (that is, turned by 180°) and the connection procedure can provide for a clockwise or a counterclockwise rotation.

Last but not least, another object of the invention is that of making a device and a method of connecting profiles that should be applicable using known tools, such as for example simple spanners, so as to facilitate the installation work of the operators or of the automatic machine and that should have an efficient and lasting connection over time.

SUMMARY OF THE INVENTION

The technical task, as well as these and other objects according to the present invention, are attained with a device for connecting profiles comprising a body having on each of its opposed walls first and second wings adapted for engaging a first and second portion of each of the profiles, the first and second portions being at different distances from the (previously presented) of the profile.

The present invention also relates to a method of connecting profiles, characterized in that it consists in arranging at least a first and a second double-T profiles made side by side, introducing a connecting device between the first and second lips of the first and second profile, introducing the wings between the first and second flange with longitudinal (previously presented) arranged along the development of the profile and resting the wings against the central member of the first and second profile, and in rotating the device clockwise and counterclockwise by about 90 degrees for respectively engaging the wing into the first portion of the profile and the seat on the end of the first and second lips of the second flanges of the first and second profile.

BRIEF DESCRIPTION OF THE DRAWING

Further features and advantages of the invention will appear more clearly from the description of a preferred but not exclusive embodiment of the device and of the method of connecting profiles according to the invention, where the device is illustrated by way of a non-limiting example in the attached drawings. Therein:

FIG. 1 shows a front elevation view of a device according to the present invention;

FIG. 2 shows a side elevation view of the device of FIG. 1;

FIG. 3 shows a perspective view of the device of FIG. 1;

SPECIFIC DESCRIPTION

Figure 4:
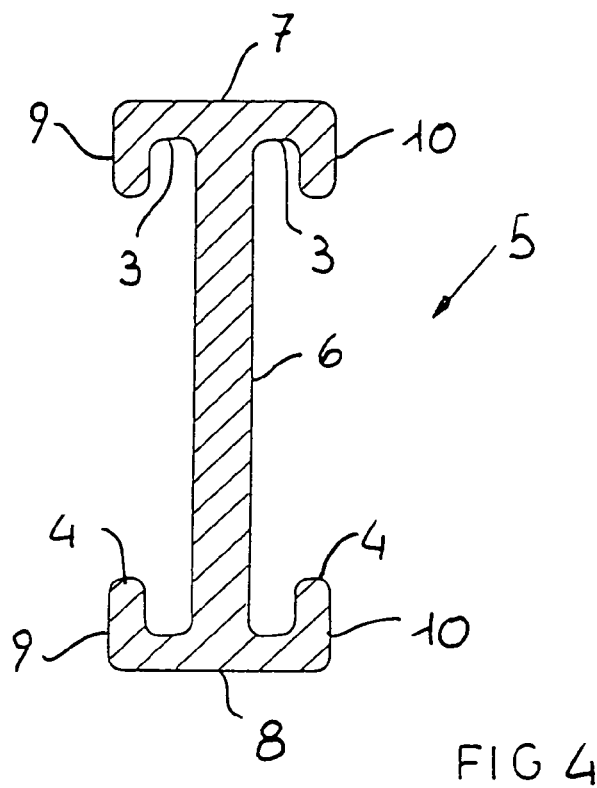
FIG. 4 shows a cross section of a profile that can house the device according to the present invention.
Figure 5:
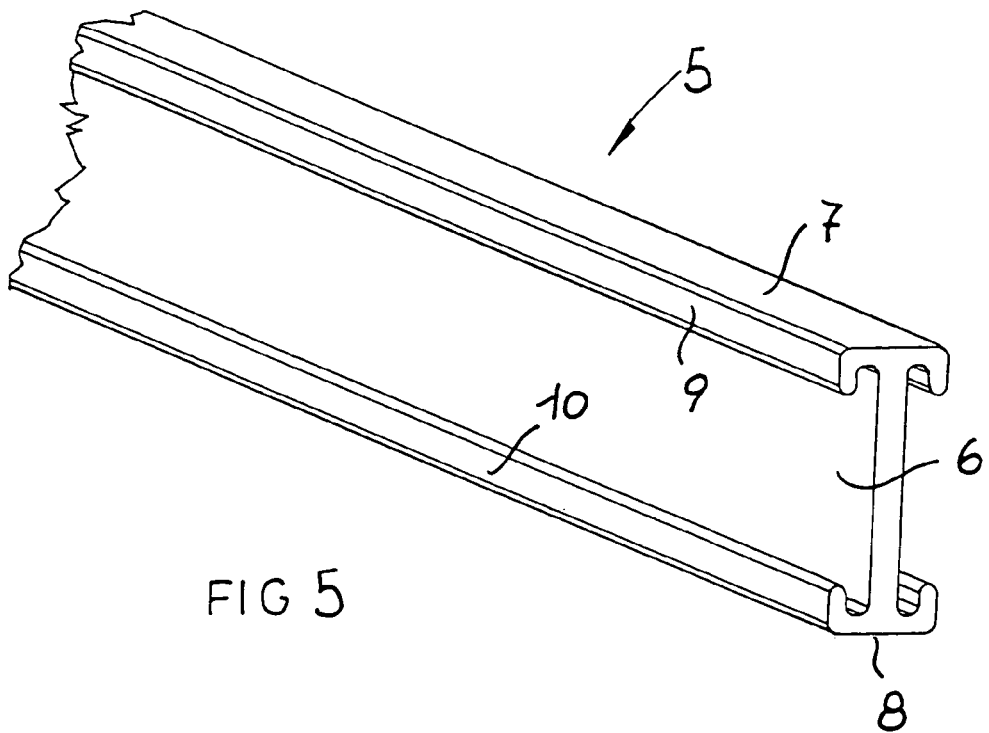
FIG. 5 shows a perspective view of the profile of FIG. 4.

A device 1 for connecting profiles comprises a body 2 having, on each of its opposed walls, first and second wings 11 adapted for respectively engaging on first and second portions 3 and 4 of each of the profiles globally indicated with reference numeral 5. Advantageously, as will be better explained hereinafter, the first and the second portions 3 and 4 are at different distances from the axis A of each profile 5 and in particular, the first portion 3 is at a smaller spacing from the axis A than the second portion 4.

For more descriptive clarity, it is noted that the profiles 5 have a section shaped as a double T, so as to have a central member 6 from the ends of which a first and a second flange 7 and 8 opposed to one another and orthogonal to it extend. At their ends, the first and second flange 7 and 8 have first and second lips 9 and 10.

In particular, the wings 11 are each spaced from the body 2 by a spacing forming an upwardly open slot 14 substantially equivalent to the thickness of the first and second lips 9 and 10 and more precisely, such as to create a predetermined friction upon connection. The wings 11 each also form a downwardly open slot 12 substantially having a width equivalent to the thickness of the first and second lips 9 and 10 of the second flange 8.

The first portion 3 of the profile is d formed by the slot defined between the upper lips 9 and 10 of the first flange 7 whereas the second portion 4 of the profile is defined by the ends of the lower lips 9 and 10 of the second flange 8.

The wing 11 has a tapered shape with rounded end, so as to allow its rotation without interference during the connection of the device with the profiles. The slot 12 has a length substantially equal to the length of the body 2 (but of course it can be of any desired length according to requirements) and its floor has a central straight portion 15 and two end rounded portions 16, so as to allow rotation of the body 2 during its connection to the profile without any interference.

Advantageously, the walls of both the wing 11 and the slot 12 are slightly inclined for determining, during their connection with the slot 3 of the first flange 7 and the edge 4 of the first and second lips 9 and 10 of the second flange 8, both a recovery of any backslash and a predetermined friction during fixing to the profile.

In this way, the wing 11 advantageously engages with the slot 3, which is stiff, whereas the straight portion 15 and the rounded end portions 16 elastically work on the first and second lips 9 and 10 of the second flange 8, which is therefore subject—during the connection—to a limited bending moment, allowing at the same time the connection and the hold by an elastic return on portion 4 that, as seen, has a large connection width.

As seen, the device is perfectly symmetrical and made in a single piece and in a material that can stand both high temperatures and fire, also allowing use or the profile or profiles in any position by a clockwise and counterclockwise rotation and by 180° rotation as well.

The device further comprises, on each wing 11, a recess 20 and a passage 21 communicating with it and with an outside surface 22 of the body for the passage of an adhesive.

Figure 6:
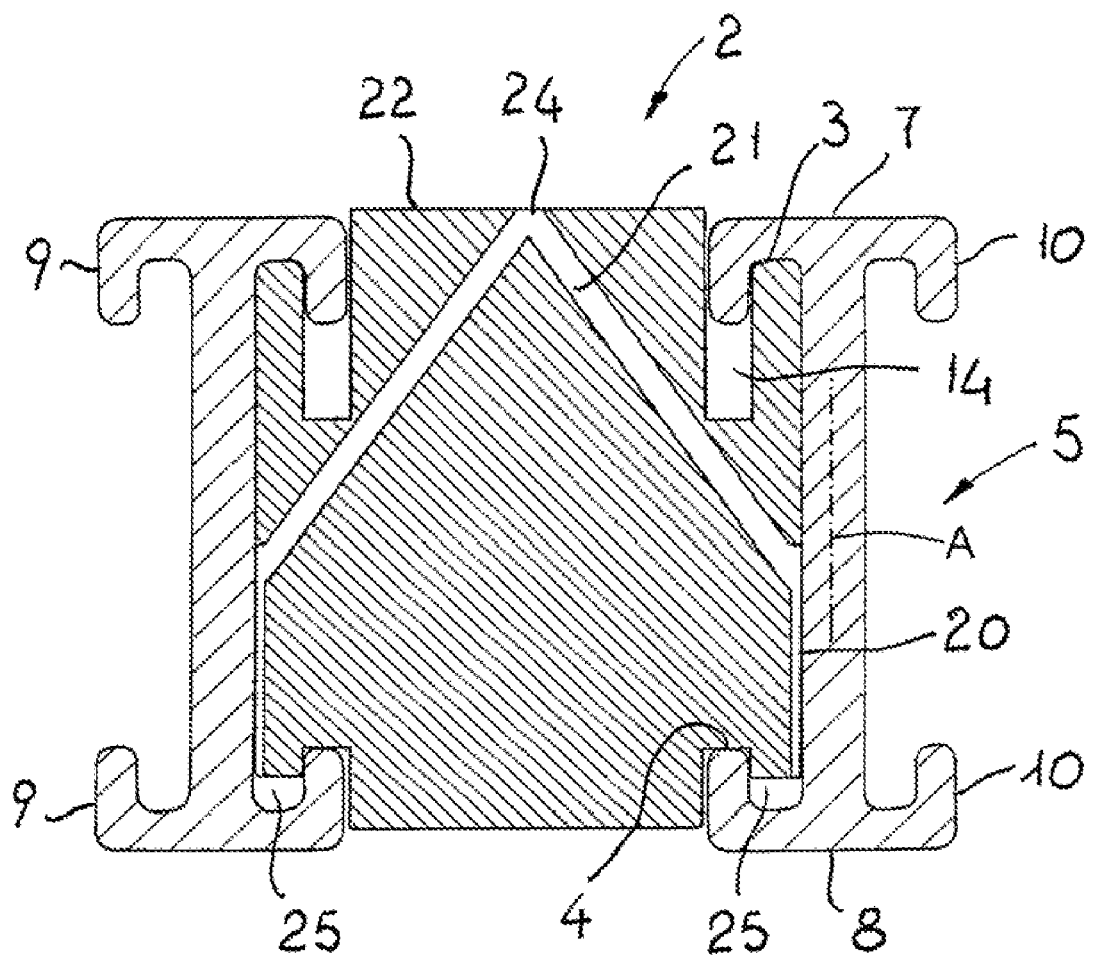
FIG. 6 shows a section of a device according to the invention, connected to two profiles.

In particular, as shown in FIG. 6, since the device is symmetrical the two passages 21 will both converge into the same adhesive inlet 24.

The raised portion 20 has a substantially triangular shape so as to facilitate the adhesive flow inside an space 25 formed with the wing 11 and the second flange 8 and adapted for collecting the adhesive in such way as to ensure a further considerable holding force between the devices and the profiles after their mutual connection.

Of course, besides being rectangular to be easily rotated by any wrench of tool, the body 2 can have an extension, not shown, for attaching other optional accessories.

The method according to the invention of connecting profiles consists in arranging at least a first and a second double-T profile next to one another, made according to the above description, and in introducing the device described above between the first and second lips 9 and 10 for example of the first and second profile.

The wings 11 are introduced into the first and second profile (the example of course also applies to a plurality of profiles to be connected) between the first and second flanges 7 and 8 with longitudinal axis arranged along the development of the profile itself.

Then, the wings are fitted to the central element 6 of the first and second profile and body 2 is turned clockwise or counterclockwise by about 90° for engaging both wings 11 into the first portions 3 of both profiles and the slot 12 with the ends 4 of the first and second lips 9 and 10 of the second flanges 8 of both the first and second profile as shown in FIG. 6.

Once several devices have been connected to profiles according to requirements (they can be connected or disconnected several times), it is possible to introduce an adhesive into inlets 24 so as permanently connect the devices to the profiles.

Advantageously, moreover, on the surface facing toward the central element of each wing 11 there is at least one rib (not represented in the drawings) suitable for forming clearances between the two surfaces during the coupling of the connection device with the profiles. The rib can be straight or, in a preferred solution, curved so as not to block the rotation of the connection device during its installation but, on the contrary, to guide it during such an operation. Moreover, whether the rib is straight or curved it has a tapered shape, i.e. higher in the central part and lower in the two opposite end parts with respect to the central part. In this way a progressive engagement of the rib with the central element 6 is obtained during the rotation operation. In a variant, moreover, the seat 14 can have a depth equal to the length of the wings 9 and 10 so that the wings engage with the base of the seat 14.

The operation of the device for connecting profiles according to the invention is evident from what described and illustrated and in particular, it substantially is as follows:

When the device is installed, the mechanical hold action ensured by wings 11 into slots 3 and by ends 4 of lips 9 and 10 of the second flange 8 into seats 12 and of the adhesive inserted into the recesses 20 ensures the connection of each profile to the device and therefore ensures the mutual connection between profiles 5 in an equally spaced manner.

The devices can be installed along the profiles in any position also adapted for allowing shortening predetermined profiles in case of need.

Advantageously, seats 12 are provided with a wide straight surface for resting against the profiles so as to distribute the strains and prevent concentrated stresses that could be very harmful and have low resistance to stresses.

Advantageously, the rotation can be either clockwise or counterclockwise and thanks to the symmetry of the profiles, the device can be installed in one and in the opposed direction on the profiles; this allows obtaining a great flexibility in the assembly, also automated, of the profiles.

In practice it has been noted that the device and the method of connecting profiles according to the invention are especially advantageous since they allow making structures made of a composite material, such as plastic reinforced by fibre glass with matrix made of plastic material, very strong and resistant with a high resistance to corrosion and to fire and in an automated manner.

Several changes and variants can be made to the device and the method of connecting profiles thus conceived, all falling within the scope of the inventive concept; moreover, all details can be replaced by technically equivalent elements.

In practice the materials used as well as the sizes, can be of any type according to the requirements in to the prior art.

The invention claimed is:

1. In combination with a pair of double-T profiles each having a flat central member centered on an upright axis and upper and lower end flanges each having outer edges formed with respective downwardly and upwardly projecting lips forming with the central member respective downwardly and upwardly open seat grooves, a connector formed unitarily with:

a central body fittable between the profiles and a pair of opposite wings projecting from the body, engageable with respective faces of the respective central members of the profiles, and each having an upwardly projecting edge fitting into the respective downwardly open seat groove and defining an upwardly open slot into which fits the respective downwardly projecting lip and a downwardly projecting edge fitting into the respective upwardly open seat groove and defining a downwardly open slot into which fits the respective upwardly projecting lip, the upwardly projecting lips bearing directly on floors of the respective downwardly open seat grooves and the downwardly projecting lips being spaced upward from floors of the respective upwardly open seat grooves, the upwardly open slots having floors spaced downward from the respective downwardly projecting lips, the downwardly open slots having floors each formed with a straight central portion bearing directly on the respective upwardly projecting lip and rounded end portions out of contact with the respective upwardly projecting lip such that the connector bears directly downward on each of the profiles at a location that is spaced differently from a location at which it bears upwardly on the respective profile, the slots and edges extending a full length of the body.

2. The combination according to claim 1 wherein said wings are spaced from said body by a spacing substantially equal to a thickness of the lips.

3. The combination according to claim 1 wherein the upwardly open slot has a width substantially equal to a thickness of the respective upwardly projecting lip.

4. The combination according to claim 1 wherein faces of said wing and of said seat are slightly inclined for determining, during their connection with said slot and said end of said first and second folds of said second face, a recovery of any backslash and a friction during the fixing.

5. The combination according to claim 1 wherein the connector is perfectly symmetrical.

6. The combination according to claim 1 wherein the connector can be fitted to said profile by turning it clockwise or counterclockwise.

7. The combination according to claim 1 wherein the body is formed with a passage opening into recesses on faces of the wing and therethrough into the downwardly directed slots for the introduction of an adhesive.

8. The combination according to claim 7 wherein each recess has a substantially triangular shape.

9. The combination according to claim 7 wherein said central member has a face forming a space with the respective wing adapted for holding said adhesive.

10. The combination according to claim 1 wherein said body has an extension for the connection of accessories.

11. The combination according to claim 1 wherein the connector is formed unitarily of a material resistant to high temperatures and/or to fire.

\* \* \* \* \*